United States Patent
Shoff et al.

(10) Patent No.: US 6,683,630 B1
(45) Date of Patent: Jan. 27, 2004

(54) METHODS AND ARRANGEMENTS FOR ALLOWING INDEPENDENT PROGRAM MODULES TO ACCESS SHARED DISPLAY DEVICE RESOURCES

(75) Inventors: Daniel J. Shoff, Issaquah, WA (US); John T. Cooper, III, Bellevue, WA (US); Jun Liu, Redmond, WA (US); Robert S. T. Gibson, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/560,857

(22) Filed: Apr. 28, 2000

Related U.S. Application Data

(60) Provisional application No. 60/147,709, filed on Aug. 6, 1999.

(51) Int. Cl.$^7$ .................................................. G09G 5/00
(52) U.S. Cl. ........................ 345/805; 345/803; 345/794
(58) Field of Search ................................. 345/629, 722, 345/723, 625, 630, 700, 790–797, 802–807

(56) References Cited

U.S. PATENT DOCUMENTS

| | | | | |
|---|---|---|---|---|
| 5,212,770 A | * | 5/1993 | Smith et al. ................ | 345/745 |
| 5,367,316 A | * | 11/1994 | Ikezaki ........................ | 345/158 |
| 5,577,188 A | * | 11/1996 | Zhu ............................. | 345/745 |
| 5,805,165 A | * | 9/1998 | Thorne, III et al. ......... | 345/823 |
| 5,808,604 A | * | 9/1998 | Robin .......................... | 345/862 |
| 6,359,631 B2 | * | 3/2002 | DeLeeuw .................... | 345/629 |

* cited by examiner

*Primary Examiner*—John Cabeca
*Assistant Examiner*—Tadesse Hailu
(74) *Attorney, Agent, or Firm*—Lee & Hayes, PLLC

(57) ABSTRACT

Virtual display layers are associated with each process within a programmable set top box requiring access to a shared front panel display therein. An ordered set of virtual display layers is used to determine the information that is ultimately displayed on the shared display device. The shared display device includes a plurality of selectively controllable light emitting diode (LED) elements located on the front panel of the set top box. These LED elements correspond to data defined in the virtual display layers. The data includes flag data that associates certain properties with an element, mask data that identifies if the element is visible (e.g., opaque) or not visible (e.g., transparent) to the process, and context data that sets the state or status of the element (e.g., ON/OFF). A composite display layer is created using applicable data from the ordered set of virtual display layers. The resulting composite display layer provides the data that defines the information displayed via the display device.

41 Claims, 8 Drawing Sheets

METHODS AND ARRANGEMENTS FOR ALLOWING INDEPENDENT PROGRAM MODULES TO ACCESS SHARED DISPLAY DEVICE RESOURCES

RELATED APPLICATIONS

This application claims priority from U.S. Provisional Application Ser. No. 60/147,709, filed Aug. 6, 1999, the disclosure of which is incorporated by reference herein

TECHNICAL FIELD

This invention relates generally to display devices and, more particularly, to methods and arrangements that provide various modules access to shared display device resources.

BACKGROUND

Various appliances and other common devices have front panel displays that are used to convey information to the user. For example, a video tape recorder (VCR), compact disc (CD) player, digital versatile disk (DVD) player, or cable television (CATV) control box typically have some form of a front panel display device. Machines such as these are usually designed to perform a particular function. For instance, the VCR is designed to record and play video/audio signals using a removable video tape cartridge. Thus, within these machines, the display device is typically under the rigid control of a knowledgeable display driver program that is arranged to control the information that is displayed and arbitrate accordingly if more than one process desires to display information to the user.

For multi-tasking machines, such as, for example, programmable computers, multiple-purpose appliances, and the like, designing and implementing a robust and knowledgeable display driver can be challenging, because there may be several different programs running simultaneously, each of which has specific display needs. Additionally, these various programs may have been provided by different vendors. Thus, a robust and knowledgeable display driver would need to be designed to overcome these difficulties while also providing for future growth and expansion of the machine in terms of supporting new tasks, new display requirements, new programs, etc.

To make matters worse, certain machines need to have reduced storage/processing overhead to be competitive and cost-effective. For example, it would be advantageous to provide a programmable set top box having minimal memory and/or other logic support designated for use by the internal display device (e.g., a front panel display). Employing conventional display driver techniques within an efficient set top box would tend, however, to be overly burdensome and thereby reduce the cost-effectiveness of the unit.

Consequently, there is a need for improved methods and arrangements that can be easily and/or efficiently implemented in machines having display devices that are shared by one or more processes. Preferably, the methods and arrangements will allow for future growth and expansion of the machine in terms of adding new processes, changing/removing old processes, adding new display requirements, or otherwise altering tasks associated with the machine.

SUMMARY

The present invention provides various methods and arrangements that are easy and efficient to implement in a wide variety of machines. The machines can include one or more display devices that are shared by one or more processes. The display device can be used to simultaneously meet the display requirements of the various processes in an organized and predictable manner. The methods and arrangements allow for future growth and expansion of the machine. For example, processes can be added, changed, or removed without requiring modifications to the display driver.

Thus, in accordance with certain aspects of the present invention, a method is provided for sharing a physical display device between a plurality of processes. The method includes associating a first process with a first virtual display layer and at least a second process with a second virtual display layer, combining the first and second virtual display layers to produce a composite virtual display layer, and displaying data associated with the composite virtual display layer on the display device. The first virtual display layer and the second virtual display layer can be ordered with respect to one another, for example, with respect to a timeline or other priority scheme.

The first virtual display layer can be represented by corresponding first layer data, and the second virtual display layer can be represented by corresponding second layer data. Each of the first and second layer data includes content data that defines at least one desired state for at least one controllable element in the display device, flag data that defines at least one desired associated property for the controllable element in the display device, and mask data that selectively defines controllability over the controllable element in the display device. In this manner, for example, an element in the display device can be defined as being opaque or transparent using the mask data. For elements that are opaque, then their content (e.g., On/Off, character/code, etc.) can be set using the content data. Further properties may be associated with the opaque element using the flag data. Thus, the element may have an associated property such as, for example, selectively dimmed, selectively brightened, selectively flashed, selectively blinked, selectively colored, selectively toned, selectively patterned, and the like.

The above stated needs and others are also met by a method for displaying data on a display device. Here, the method includes creating at least one virtual display layer that defines at least a portion of the display device as being controllable, and altering the portion of the display device based on the at least one virtual display layer.

In accordance with certain other aspects of the present invention, a method for multiplexing information from one or more processes to a physical display device is provided. This method includes associating each process with a different virtual display layer, updating at least one of the associated virtual display layers with information during execution of the process, determining if portions of the associated virtual display layer are displayable, and displaying the displayable portions of the associated virtual display layer.

In accordance with still other aspects of the present invention, a computer-readable medium having stored thereon a data structure is provided. The data structure includes layer data that is associated with a program module. The layer data includes flag data representing at least one desired associated property for at least one controllable element in a display device, mask data that selectively defines controllability over the at least one controllable element in the display device, and content data that defines at least one desired state for the at least one controllable element in the display device.

An arrangement for use in a multiple tasking computer environment is also provided. Here, the arrangement includes at least one processor, memory, and at least one shared display device. The processor is configured to associate a first process with a first virtual display layer and a second process with a second virtual display layer, and logically combine corresponding layer data to form composite information. The processor is configured to output the composite information to the display device.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

In the examples that follow, a programmable set top box device is described in greater detail. This exemplary set top box device is configured to interact with a network to provide various services to a user. For example, the set top box may support entertainment/television services, interactive services, Internet services, and the like.

The set top box includes a front panel display that is shared by various program modules and used by these various program modules to convey information to the user. For example, a clock program module may use the display panel to display the time of day, a channel selection program module may use the display panel to display the current channel, a message service program module may use the display panel to alert the user that a message has arrived, and/or a power state manager program may use the display panel to identify that the set top box is "On". In the past, these various program modules would interact with a knowledgeable display control driver or similar program that would need to determine which of the program modules has access to the display panel at a given time.

In the selected example, the front panel display includes light emitting diode (LED) indicators and multiple segment LED indicators. The various methods and arrangements described and claimed herein are also directly applicable to other types or mixed types of displays in addition to LED-based displays. Thus, for example, liquid crystal displays (LCDs), cathode ray tube (CRT) displays, active matrix displays, plasma displays, light bulb displays, mechanical displays, and/or other similar displays may be used.

Furthermore, it should be kept in mind that a set top box is but one example of a machine or device that can benefit from the various methods and arrangements disclosed and claimed herein. Those skilled in the art will clearly recognize that the various methods and arrangements of the present invention are as equally applicable to any type of machine that has a shared display resource. Thus, for example, a computer system, a peripheral device, a portable computing device, a communication device (e.g., a cellular telephone, a pager, or the like.), an appliance, a vehicle, an instrument, a tool, or the like will all benefit from the present invention.

Figure 1:
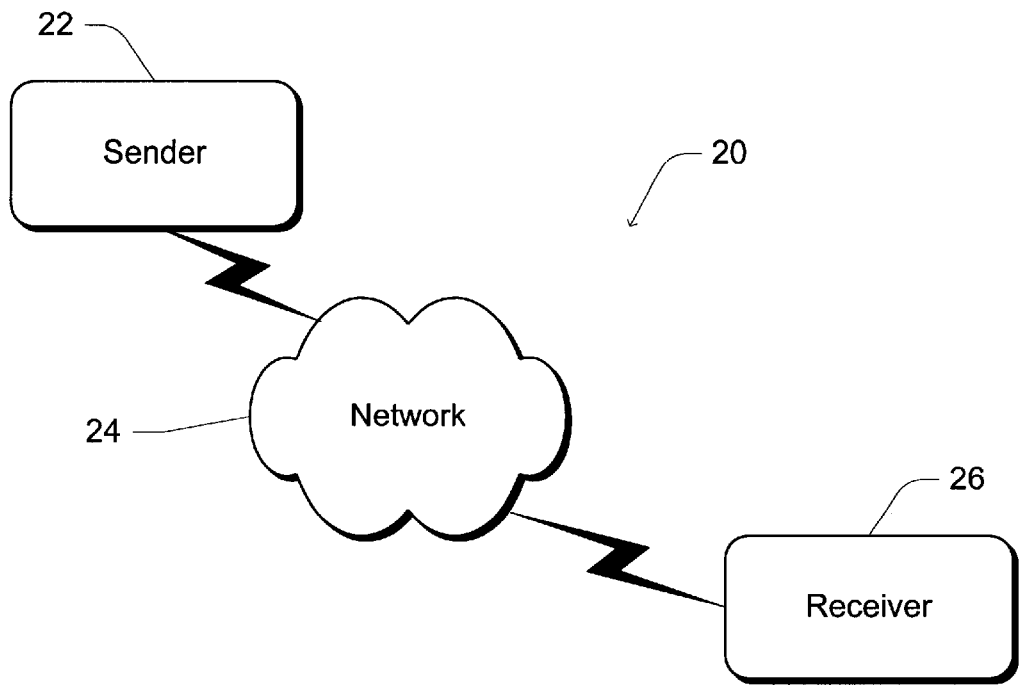
FIG. 1 is a block diagram depicting a communication arrangement having a sender node and a receiver node, in accordance with certain exemplary implementations of the present invention.

With this in mind, FIG. 1 is a block diagram depicting a generic communication arrangement 20 having a sender node 22, a network 24 and a receiver node 26, in accordance with certain exemplary aspects of the present invention.

Sender node 22 can include one or more devices that are configured to share data with receiver 26 through network 24. By sharing data, it is meant that sender node 22 may send data to receiver 26 and/or receive data from receiver 26. One common device for sender node 22 is a computer system or several computer systems (e.g., servers, etc.) that are configured to provide data to receiver 26. The data may include, for example, voice data, video data, text data, graphical data, control data, and the like. The data may be digital and/or analog.

The data is transported between sender node 22 and receiver node 24 by network 24. Network 24 may include private and/or public communication resources that are configured to carry signals containing data between at least the two nodes. Network 24 may include a packet switched network, such as, for example, the Internet or an Intranet, and/or a circuit switched network, such as, for example, a public or private telecommunications system network.

In accordance with certain exemplary implementations of the present invention, sender node 22 and network 24 are part of a wide-band network, such as, for example, a cable television network that is configured to provide various services to receiver node 26.

Depending upon the requirements/purpose of communication arrangement 20, receiver node 26 may take on a variety of forms. For example, receiver node 26 may include a general or special purpose computer system or other devices that provide specific communication capabilities, or otherwise interact with the data and/or the user.

In the examples that follow, receiver node 26 includes a programmable set top box device as described earlier, that is configured to interact with a wide-band network, such as, for example, a cable television network that provides various services to receiver node 26.

Figure 2:
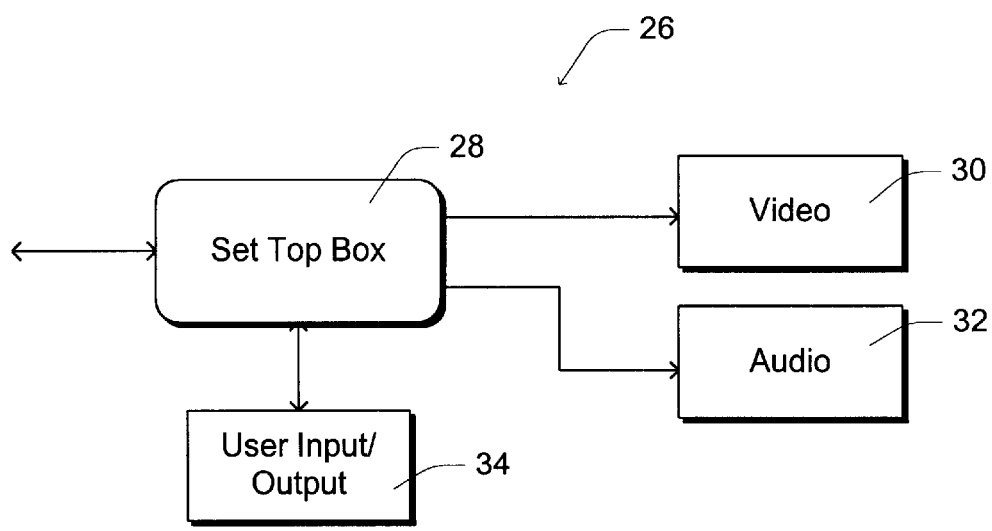
FIG. 2 is a block diagram depicting a receiver node, for example, as in FIG. 1, having a set top box.

FIG. 2 is a block diagram depicting receiver node 26 having a set top box 28. Set top box 28 is configured to send and/or receive data via network 24 and output one or more signals/data to one or more other devices coupled to set top box 28. As shown in FIG. 2, set top box 28 outputs video data 30 and audio data 32. Video data 30 can, for example, include a signal that is compatible with an analog television and/or digital television/monitor. Audio data 32 can, for example, be associated with video data 30 and compatible with an analog and/or digital audio device. Set top box 28 is further coupled to provide user input/output data 34. User input/output data 34 can, for example, include text data, graphical data, control data, and the like, that is associated with an application program operating within set top box 28, elsewhere in receiver node 26, and/or sender node 22.

Figure 3:
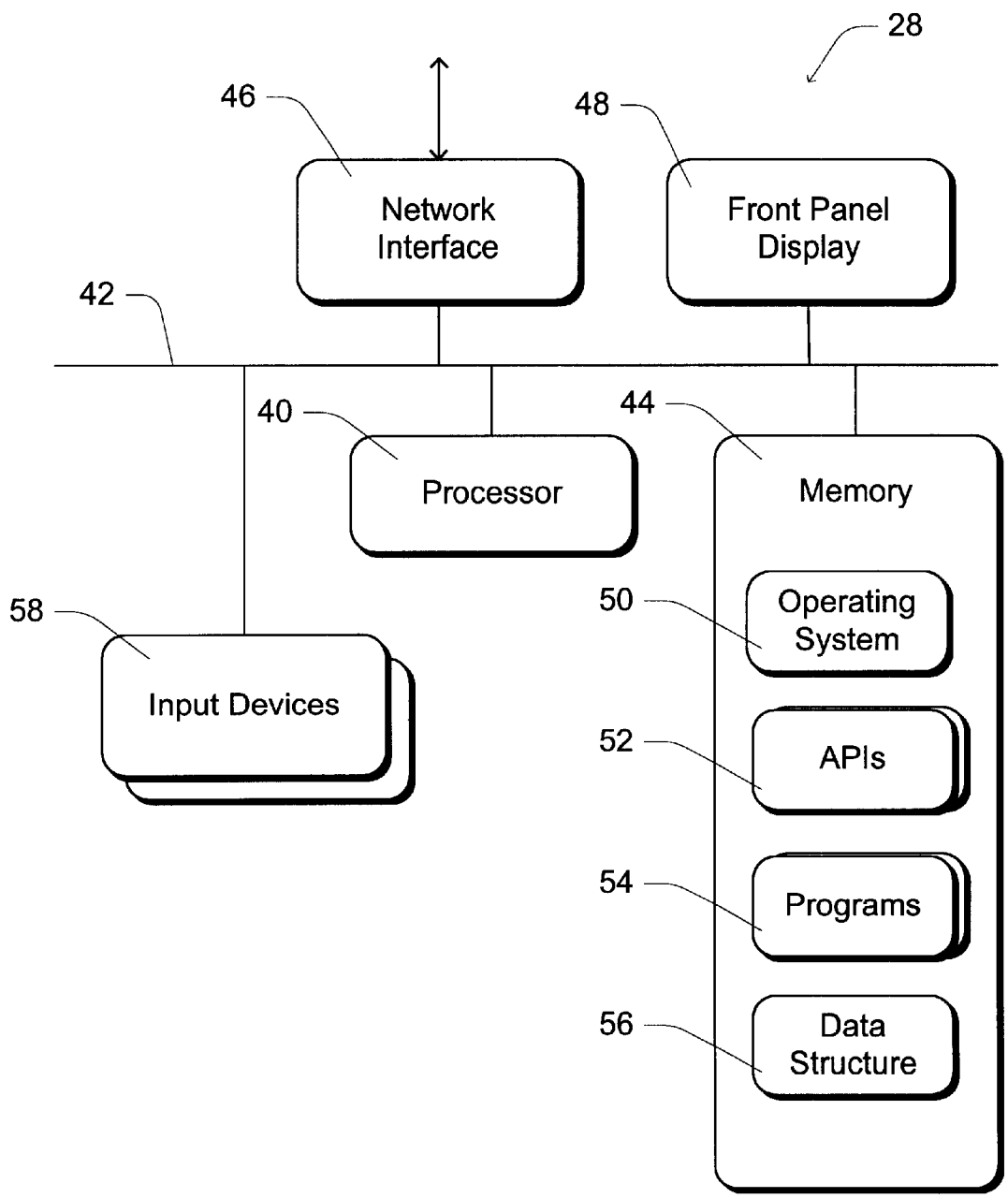
FIG. 3 is a block diagram depicting certain portions of a set top box, as in FIG. 2, for example, having a processor that provides selected information from a data structure to a display device.

Reference is now made to FIG. 3, wherein a block diagram depicting certain portions of set top box 28 is shown. Set top box 28 includes at least one processor 40. Processor 40 is operatively coupled through a bus 42, or like arrangement, to a memory 44. Memory 44 may include one or more types of volatile and/or non-volatile memory. For example, as is commonly known, memory 44 can include a random access memory portion (RAM) and a read-only memory (ROM) portion. In certain implementations of the present invention, memory 44 includes a FLASH memory portion, and a non-volatile RAM (NVRAM) portion. The FLASH memory portion is used to store operating system instructions and the like, while the non-volatile RAM (NVRAM) portion can be used to support operations that require non-volatility or standard memory access. Memory 44 may also include a magnetically accessed, and/or optically accessed memory portion.

A network interface 46 is operatively coupled through bus 42 or the like to processor 40. Network interface 46 is essentially configured to send and/or receive data from network 24.

A front panel display 48 is operatively coupled through bus 42 or the like to processor 40. Front panel display 48 is configured to be responsive or otherwise controlled by processor 40 in a manner such that selected information is displayed to the user. Thus, a program module or the operating system may access front panel display 48 and selectively display user and/or diagnostic information.

To accomplish this, a plurality of program instruction sets are provided in memory 44. As representationally depicted in this example, memory 44 includes an operating system 50 that is configured to control set top box 28. One or more application programming interfaces (APIs) 52 or the like may be provided to provide an interface between operating system 50 and one or more programs 54. Programs 54 may include applications and/or other program modules designed to take advantage of the various features of set top box 28 and/or other devices/programs interacting therewith. Included within programs 54, for example, there may be a plurality of program modules that need to access the front panel display of set top box 28.

Set top box 28 may also include one or more input device interfaces 58. Input device interfaces 58 can be operatively coupled through bus 42 or the like to processor 40. Input device interfaces 58 may be arranged to allow the user to use an infrared remote control or other similar device to interact with the various services provided through set top box 28.

Figure 4:
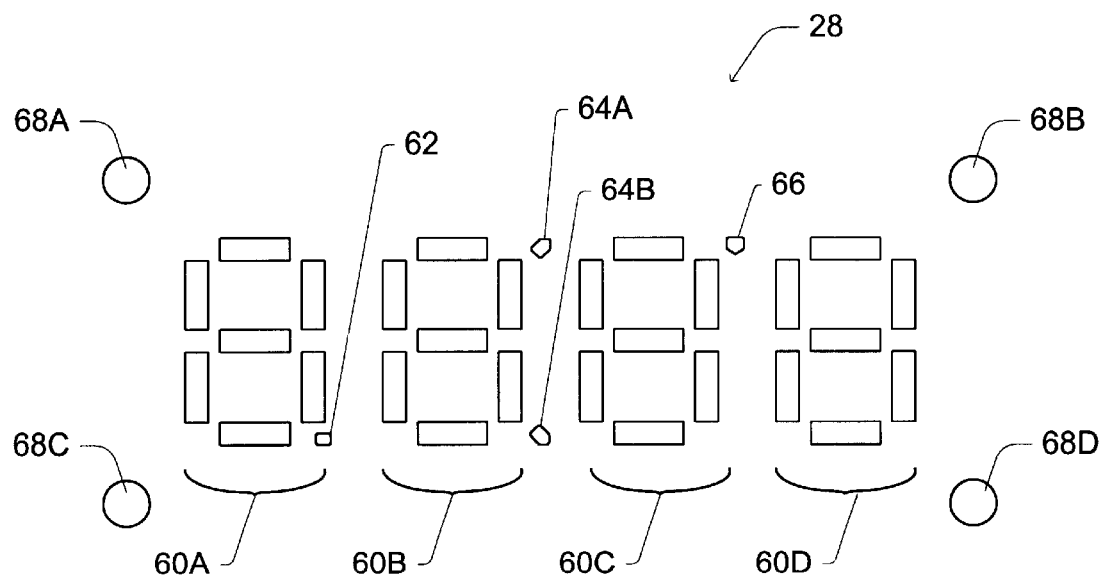
FIG. 4 is an illustrative block diagram depicting certain portions of a display device, for example, as in FIG. 3, having a plurality of selectively controlled display elements.

In FIG. 4, an illustrative block diagram depicts certain portions of an exemplary front panel display 48 having a plurality of selectively controlled display elements. Here, front panel display 48 includes a plurality of seven-segment digits 60A–D that are capable of displaying a variety of alphanumeric characters, etc. Also included in this example, are a lower single-segment point 62, a dual-segment point 64A–B, and an upper single segment point 66 that can be used to provide decimal points, colons, semicolons, commas, etc. in conjunction with digits 60A–D.

Also provided within front panel display 48 is a plurality of indicators 68A–D, each of which is arranged to convey information about a particular aspect of set top box 28. For example, in certain implementations indicator 68A is red in color and conveys that messages have arrived for the user, indicator 68B is yellow in color and conveys an "A/B" selection associated with different services, indicator 68C is yellow in color and conveys an "On/Off" status, and indicator 68D is yellow in color and conveys that a signal or command was received from a remote control. Note that in certain implementations, a protective translucent dark colored lens (not shown) may further cover front panel display 48.

Figure 5:
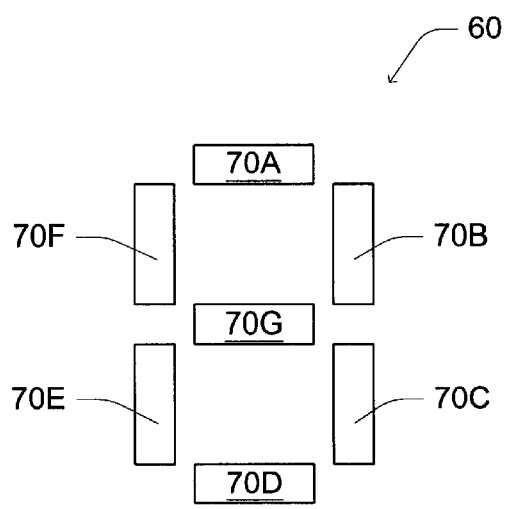
FIG. 5 is an illustrative block diagram depicting certain exemplary display elements of FIG. 4 in greater detail.

FIG. 5 further depicts the display elements within a seven-segment digit 60 (e.g., as in digits 60A–D of FIG. 4). As shown, digit 60 includes seven segments or elements 70A–F that can be configured as needed to provide a plurality of display characters. Preferably, all of the elements in FIGS. 4 and 5 can be independently activated. In certain implementations, however, digit 60 can be further and/or optionally associated with a code or the like that defines which of the elements are activated. Thus, for example, as is well known, an ASCII (character set) interface (0–127) can be decoded into a corresponding representation on front panel display 48.

As described above, the various elements depicted in front panel display 48 are required to service a plurality of program modules 54. Designing a controlling program to oversee this shared resource, especially in a set top box 28 that can be updated on-line, tends to be non-trivial since knowledge of the various program module requirements is typically useful.

Thus, new methods and arrangements have been developed to substantially remove the need for an elaborate or knowledgeable controlling program that polices access to shared front panel display 48. Instead, a simpler display driver program is provided in the operating system 50, for example, through an API 52. The simpler display driver program employs a data structure 56 that reflects layer data associated with one or more virtual display layers. By combining the layer data, the display driver program is able to determine a composite data defining the current state of front panel display 48.

Thus, in accordance with certain aspects of the present invention, for example, a virtual display architecture is provided (e.g., within data structure 56) in which each program module 54 has the ability to create its own virtual display layer. A virtual display layer includes information that corresponds to the program modules 54 settings that are desired for the various elements (and/or parameters associated therewith) of front panel display 48. As described below, a plurality of virtual display-layers (hereinafter, referred to simply as "layers") can be logically arranged in such a manner that certain portions of different layers are considered visible (or opaque and in the foreground), while other portions are considered non-visible (transparent and/or in the background of an opaque portion). A resulting composite data of the visible data determines the state or status of the various elements within front panel display 48.

Figure 6:
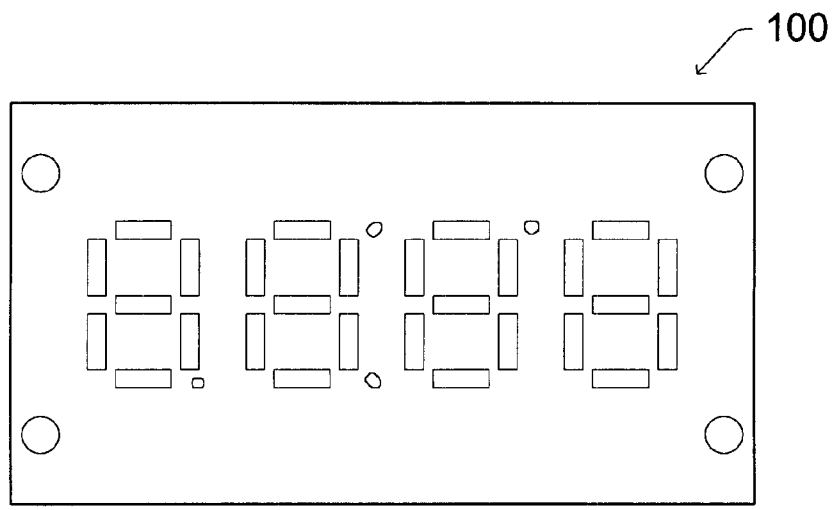
FIG. 6 is a representational depiction of a virtual display layer that is associated with a program module and configured, for example, to selectively control one or more of the plurality of display elements in FIG. 4.

FIG. 6 is a representational depiction of a layer 100 that is associated with a program module 54 and configured, for example, to selectively control one or more of the plurality of display elements in front panel display 48. As shown, layer 100 graphically includes these various elements (refer to FIGS. 4 and 5).

Figure 7:
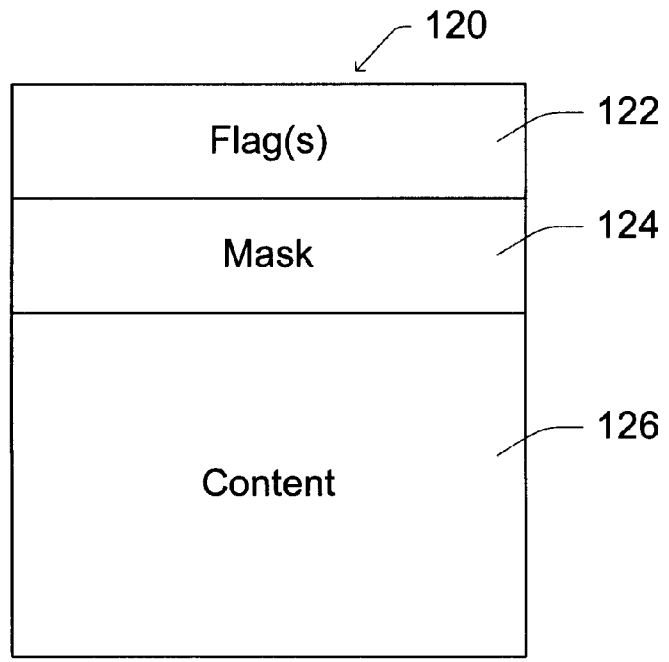
FIG. 7 is a representational depiction of layer data associated with the virtual display layer of FIG. 6.

Layer 100 is provided in data structure 56 in the form of layer data 120, for example, as representationally depicted in FIG. 7. Here, layer data 120 is associated with layer 100 through the use of flag data 122, mask data 124 and content data 126. API 52 is configurable to allow a program module 54 to create layer data 120.

Flag data 122 identifies that certain properties are associated with layer 100. For example, flag data 122 may identify that the entire layer or selected elements of front panel display 48 are to be dimmed, brightened, flashed, blinked, and/or otherwise controllably altered in some defined manner (e.g., color, tone, pattern, etc). Consequently, flag data 122 may be empty, include a simple binary indicator, and/or otherwise provide information that defines one or more parameters associated with the activation/deactivation process for the front panel display 48. By way of example, flag data 122 may be toggled to dim/brighten the layer or selected elements therein, based on a corresponding "On/Off" status.

Mask data 124 defines which of the various elements in front panel display 48 are to be controlled. Mask data 124 can include binary data that is associated with each element or a definable subgroup of elements in front panel display 48 and configured to identify if the layer considers the element or subgroup opaque or transparent. Thus, for example, indicator 68A may be set to opaque using a "1" value, or transparent using a "0" value. When opaque, indicator 68A may be activated or deactivated by the associated program module 56. Conversely, when transparent, indicator 68A may not be activated or deactivated by the associated program module 56. This is demonstrated in further examples below.

Content data 126 defines the settings the various elements in front panel display 48. Thus, for example, indicator 68A (if opaque) may be activated by program module 56 to convey that a message has arrived. Content data 126 may also include activating/deactivating binary data for each of the elements and/or subgroups thereof. As with flag data 122, certain additional information may be included to further enhance the operation of certain elements or subgroups.

Figure 8:
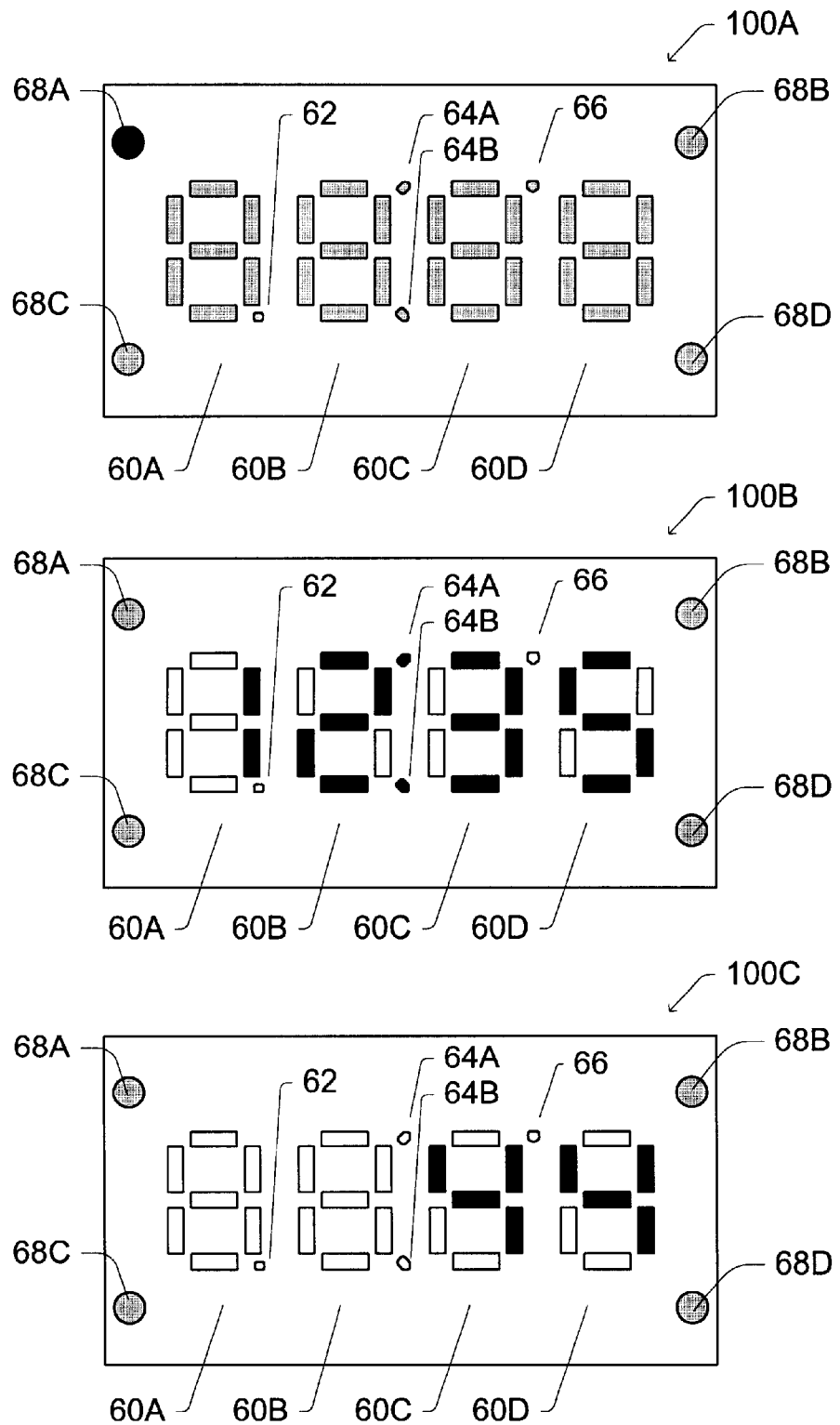
FIG. 8 is a representational depiction of a plurality of exemplary virtual display layers, each of which is associated with a program module and demonstratively configured, for example, to selectively control one or more of the plurality of display elements in FIG. 4.

FIG. 8 is a representational depiction of a plurality of exemplary layers 100A–C, each of which is associated with an independent program module 56.

The upper-most layer, 100A, is associated with a message service program module. As indicated by darkening, indicator 68A is defined as being opaque and therefore visible. However, the remaining elements associated with front panel display 48 are transparent and therefore not visible, as graphically indicated by gray-toned filling.

The center layer, 100B, is associated with a clock service program module. Here, indicators 68A–D are defined as transparent to the clock service program module, as graphically indicated by gray-toned filling. Consequently, indicators 68A–D are therefore not visible. However, since the clock service program module needs to display a current time of day, for example, digits 60A–D and points 62–66 need to be visible. Thus, digits 60A–D and points 62–66 are defined as being opaque. In this example, a time of "12:35" is displayed in this manner by selectively activating/deactivating the appropriate elements or subgroups thereof.

Similarly, the lower-most layer, 100C, is associated with a channel selection service program module. Indicators 68A–D are defined as transparent to the channel selection service program module, as graphically indicated by gray-toned filling and are, therefore, not visible. However, since the channel selection service program module needs to display a current channel selection, for example, digits 60A–D and points 62–66 need to be visible. Thus, digits 60A–D and points 62–66 are defined as being opaque. In this example, a channel selection of "44" is displayed in this manner by selectively activating/deactivating the appropriate elements or subgroups thereof.

Various other layers 100 can be created, as needed, for a particular front panel display 48, element thereof, and/or program module 54. In accordance with certain aspects of the present invention, a plurality of layers are then logically combined to form a composite layer that essentially defines the information presented by front panel display 48. For example, a display device driver program can be included within operating system 50 and/or at least one API 52 to logically combine one or more layers 100 to form a composite layer.

Figure 9:
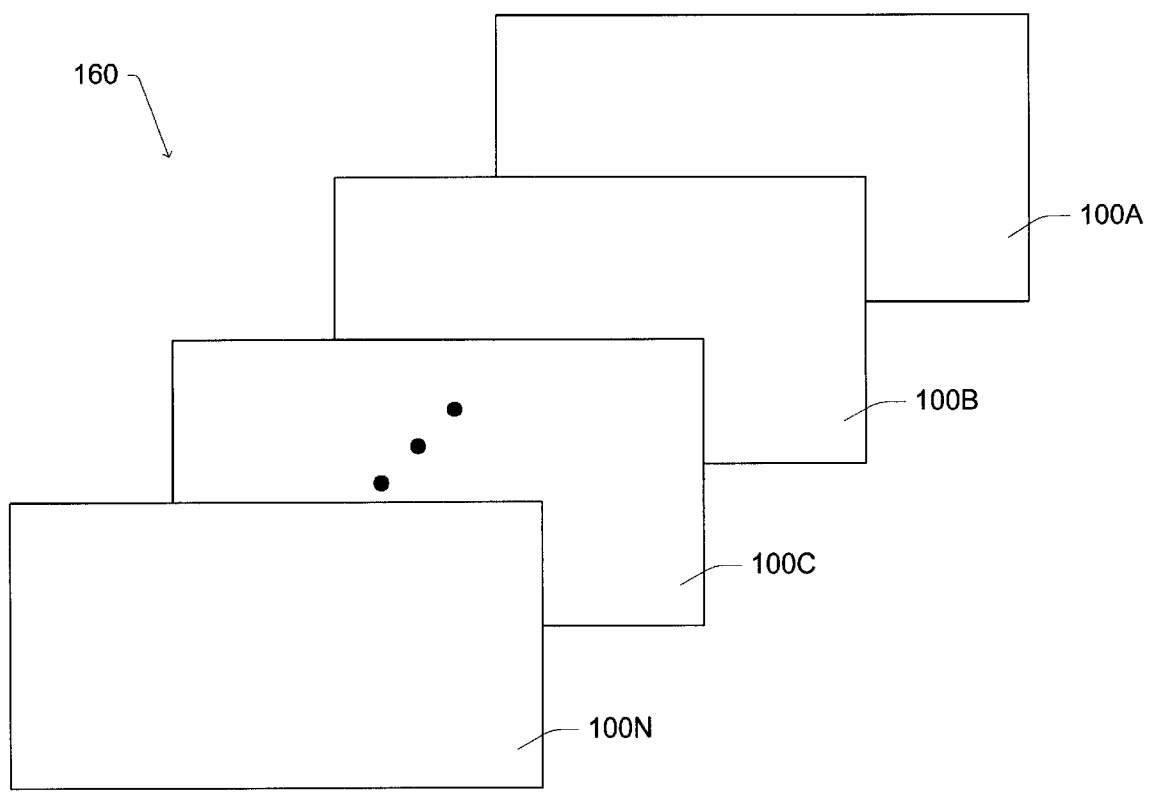
FIG. 9 is a representational depiction of a plurality of virtual display layers in an ordered set arrangement.

With this in mind, FIG. 9 is a representational depiction of a plurality of layers 100 in an ordered set arrangement 160. Here, as shown, layers 100A–N are provided, each being associated with front panel display 48. Layers 100A–C were previously shown in FIG. 8. With respect to these three layers, in ordered set arrangement 160, layer 100A (associated with a message service program module) is furthest in the background, followed by layer 100B (associated with the clock service program module), and then layer 100C (associated with the channel selection program module).

Let us assume that ordered set arrangement 160 is associated with a specific ordering composition and that only layers 100A and 100B have been created by their respective program modules. A composite of layers 100A and 100B would therefore include digits 60A–D and points 62–66, which are defined as being opaque and set to "12:35" in layer 100B. However, since layer 100B defines indicators 68A–D as being transparent, the composite will include any opaque data of layer 100A defined for indicators 68A–D. Thus, the composite (e.g., see FIG. 12) will also include the opaque setting of indicator 68A in layer 100A.

Next, assume that a channel selection change is made by the user. Here, the channel selection program module creates layer 100C, which would therefore be added to the ordering composition, e.g., in the foreground of layer 100B. The resulting composite of layers 100A–C would therefore include the digits 60A–D and points 62–66 which are defined as being opaque and set to"44" in layer 100C. Since layer 100C defines indicators 68A–D as being transparent, the composite will include any opaque data of layer 100B defined for indicators 68A–D. However, layer 100B defines indicators 68A–D as being transparent too. As such, the composite will include any opaque data of layer 100A defined for indicators 68A–D. Thus, as before, the composite will also include the opaque setting of indicator 68A in layer 100A.

Continuing with the example above, assume that the channel selection program module is configured to change layer 100C after some time-out period (e.g., 5 seconds). For example, layer 100C may be changed to redefine every element or subgroup thereof as being transparent. Alternatively, layer 100C can be removed from ordered set arrangement 160. When this change occurs, the composition ordering will revert back to that which is defined by layers 100A and 100B, as described earlier.

In this manner, ordered set arrangement 160 can include a plurality of layers (e.g., 100A–N) that can be independently created and written to by various program modules to access shared front panel display 48.

Figure 10:
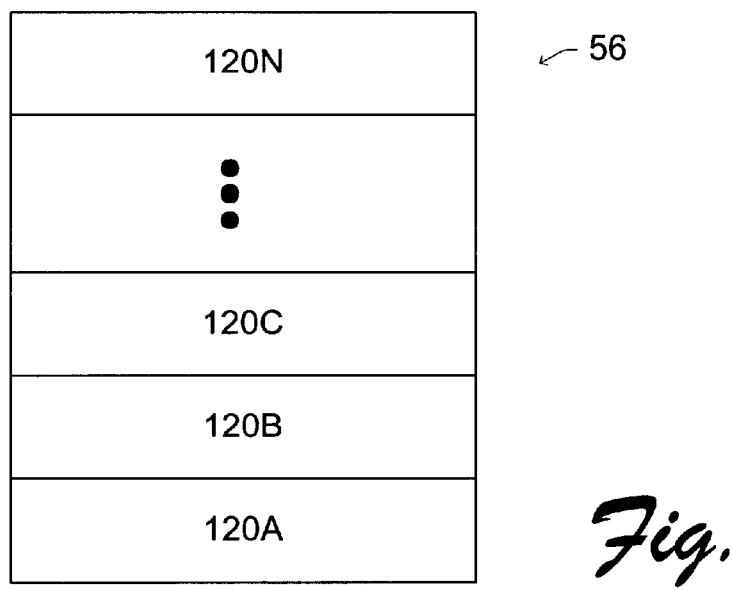
FIG. 10 is a representational depiction of a data structure having layer data associated with the plurality of virtual display layers in the ordered set arrangement of FIG. 9.

FIG. 10 is a representational depiction of data structure 56 having layer data 120A–N associated with the plurality of layers 100A–N in ordered set arrangement 160 of FIG. 9. Data structure 56 defines layer data 120A–N in a manner to preserve a timeline and/or other preferential ordering of layers 100A–N. Data structure 56 can be maintained using known data structure techniques, such as, for example, a handle can be provided for each layer data 120A–N.

Figure 11:
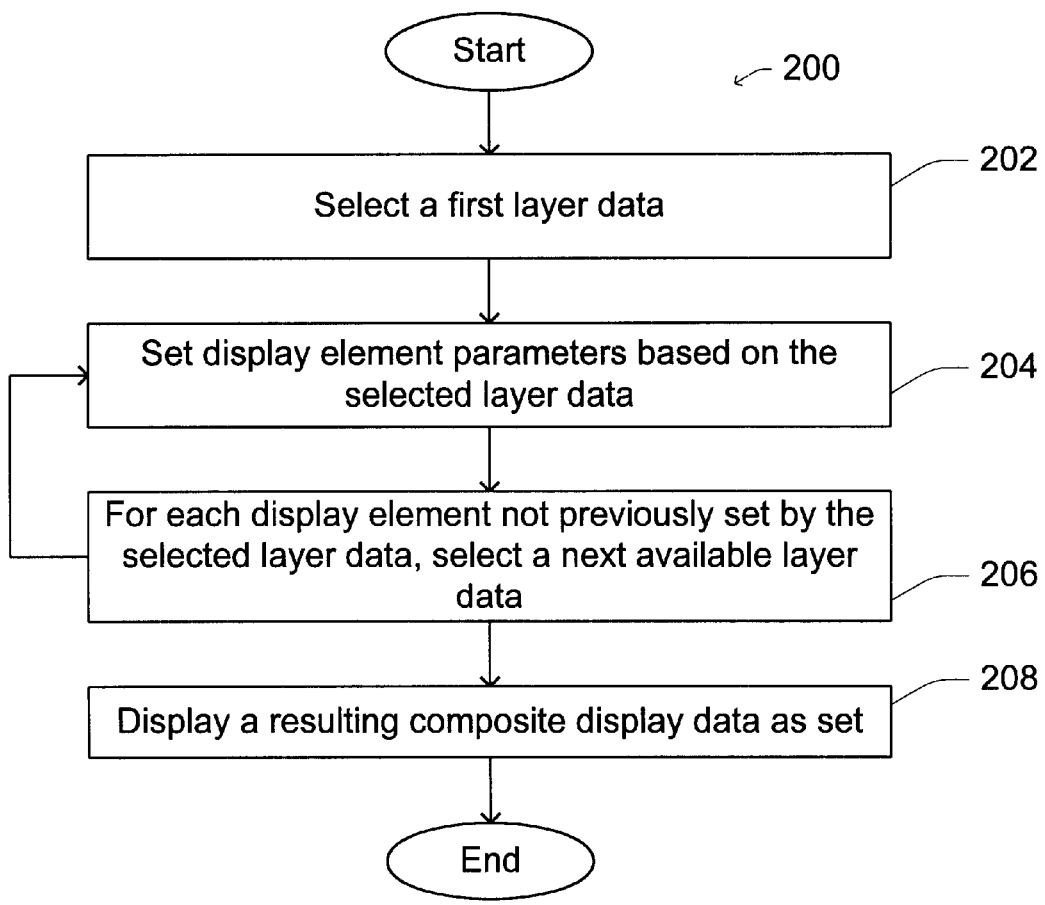
FIG. 11 is a flow-chart depicting an exemplary process for providing various program modules access to the display device using the data structure in FIG. 10.

FIG. 11 is a flow-chart depicting an exemplary process 200 for providing various program modules 54 access to front panel display 48 using data structure 56 in FIG. 10.

In step 202, at some defined point in time, and/or whenever a change is made to an existing layer data 120, a layer data 120 is removed, and/or a new layer data is created, then a first layer data 120 is selected based on a timeline and/or other preferential ordering scheme. Next, in step 204, display element parameters are set based on the selected layer data 120.

In accordance with step 206, if at least one of the display element parameters was not set based on the selected layer data 120 (e.g., it was transparent to the selected layer), then a next available layer data is selected and process 200 recursively returns to step 204.

Once all of the display element parameters have been set in steps 202–206, or all of the available layer data 120 has been selected and considered, then process 200 continues to step 208. In step 208, a resulting composite display data set is displayed via the elements of front panel display 48. Those skilled in the art will recognize that process 200 may be rerun to determine subsequent composite display data, for example, based on a change, a specified update cycle, etc.

With process 200 a program module can write to its associated layer data 120 as often (e.g., continuously, periodically, etc.) as required without having to determine how other program modules 54 are currently using front panel display 48. When a layer 100 is in the foreground it controls those elements that are opaque to the program module 54.

Thus, in accordance with certain aspects of the present invention, a context layer is essentially provided in which each program module 54 has a context associated with their respective process. When their process goes away or is otherwise not active, then their display information may or may not go away depending on the properties set. Thus, simple display controlling software can be employed to provide the application programmer with N-number (wherein, N is greater than or equal to 1) of organized context layers. Current exemplary implementations of set top box 28 allow for up to eight context layers. Other devices may require more or fewer context layers. Additionally, it is recognized that certain displays may be subdivided into several display portions, each of which may have one or more different context layers associated with it.

Figure 12:
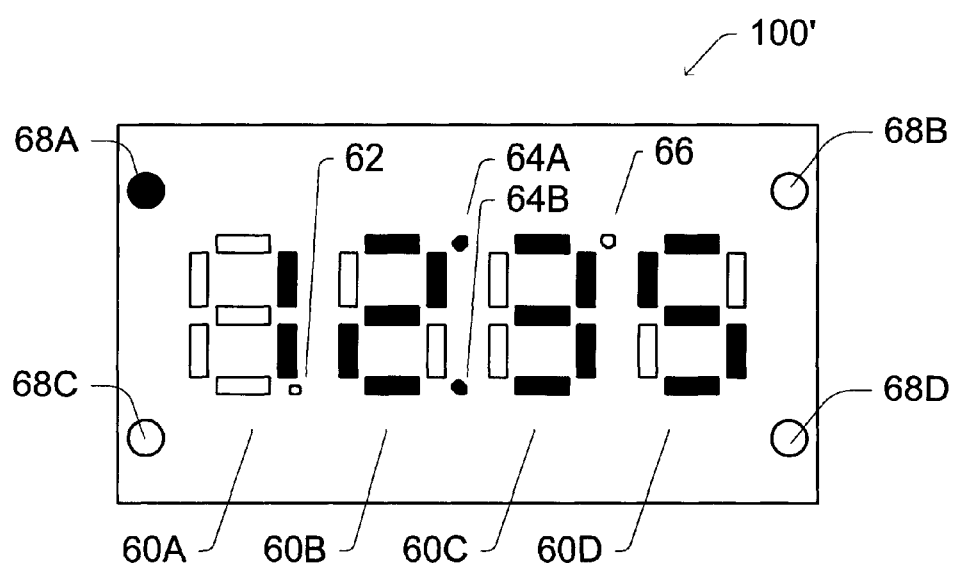
FIG. 12 is a representational depiction of a resulting composite display layer as produced, for example, by the process of FIG. 11 to selectively control one or more of the plurality of display elements in FIG. 4.

Reference is now made to FIG. 12, which shows a representational depiction of a resulting composite display layer 100' as produced, for example, by the process of FIG. 11 to selectively control one or more of the plurality of display elements in FIG. 4. In this example, layers 100A and 100B of FIG. 8 have been logically combined to form composite layer 100'. Thus, layer 100B controls the information to digits 60A–D and points 62–66, and layer 100A controls information to indicator 68A. The resulting front panel display shows that it is "12:35" and that a message has been received. As described above, other properties can also be associated with the elements in front panel display 48. For example, indicator 68A may be arranged to blink On and Off, etc.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method for sharing a physical display device between a plurality of processes, the method comprising:

associating a first process with a first virtual display layer, wherein the first virtual display layer is represented by first layer data including first content data defining at least one desired state for at least one controllable element in a display device, the first content data including at least one type of data selected from a group comprising flag data and mask data;

associating a second process with a second virtual display layer, wherein the second virtual display layer is represented by second layer data including second content data defining at least one further desired state for the at least one controllable element in the display device, the second content data including at least one type of data selected from the group comprising flag data and mask data;

combining the first and second virtual display layers to produce a composite virtual display layer based on the at least one type of data selected from the group comprising flag data and mask data within the first and second content data; and displaying data associated with the composite virtual display layer on the display device.

2. The method as recited in claim 1, wherein the first virtual display layer and the second virtual display layer are ordered with respect to one another.

3. The method as recited in claim 2, wherein the first virtual display layer and the second virtual display layer are ordered with respect to a priority scheme.

4. The method as recited in claim 1, wherein the desired state and the further desired state are each defined by binary bit values.

5. The method as recited in claim 1, wherein the flag data defines at least one desired associated property for the at least one controllable element in the display device.

6. The method as recited in claim 5, wherein the at least one desired associated property is selected from a set of associated properties comprising selectively dimmed, selectively brightened, selectively flashed, selectively blinked, selectively colored, selectively toned, and selectively patterned.

7. The method as recited in claim 1, wherein the mask data selectively defines a visible characteristic of the at least one controllable element in the display device.

8. The method as recited in claim 7, wherein the mask data selectively defines the visible characteristic of the at least one controllable element in the display device by defining the controllable element as being opaque.

9. The method as recited in claim 7, wherein the mask data selectively defines the visible characteristic of the at least one controllable element in the display device by not defining the controllable element as being transparent.

10. The method as recited in claim 1, wherein the composite virtual display layer corresponds to a composite layer data.

11. The method as recited in claim 10, wherein combining the first and second virtual display layers to produce the composite virtual layer further includes logically combining at least the first layer data and the second layer data to form the composite layer data.

12. The method as recited in claim 10, wherein the composite layer data further includes additional layer data associated with at least one additional virtual display layer.

13. The method as recited in claim 1, wherein the first layer data and the second layer data are maintained in a data structure in a computer readable medium.

14. The method as recited in claim 13, wherein the computer readable medium includes memory within a set top box.

15. The method as recited in claim 14, wherein the set top box further includes at least one processor that is operatively configured to combine at least the first layer data and the second layer data to produce a composite layer data and to display the composite layer data on the display device.

16. The method as recited in claim 15, wherein the processor is operatively responsive to at least one application programming interface (API) and a plurality of program modules including at least a first program module associated with the first process and a second program module associated with the second process.

17. A computer-readable medium having computer-executable instructions for performing steps comprising:

associating a first process with a first virtual display layer that corresponds to at least a portion of a physical display device, wherein the first virtual display layer is represented by first layer data including first content data defining at least one desired state for at least one controllable user-visible element in a display device, the first content data including at least one type of data selected from a group comprising flag data and mask data;

associating a second process with a second virtual display layer that corresponds to at least the portion of the physical display device, wherein the second virtual display layer is represented by second layer data including second content data defining at least one further desired state for the at least one controllable element in the display device, the second content data including at least one type of data selected from the group comprising flag data and mask data;

combining the first and second virtual display layers to produce a composite virtual display layer that corresponds to at least the portion of the physical display device based on the at least one type of data selected from the group comprising flag data and mask data within the first and second content data; and displaying data associated with the composite virtual display layer on the portion of the physical display device.

18. The computer-readable medium as recited in claim 17, wherein the first virtual display layer and the second virtual display layer are ordered with respect to one another.

19. The computer-readable medium as recited in claim 18, wherein the first virtual display layer and the second virtual display layer are ordered with respect to a priority scheme.

20. The computer-readable medium as recited in claim 17, wherein the desired state and the further desired state are each defined by binary bit values.

21. The computer-readable medium as recited in claim 17, wherein the flag data defines at least one desired associated property for the at least one controllable element in the display device.

22. The computer-readable medium as recited in claim 21, wherein the at least one desired associated property is selected from a set of associated properties comprising selectively dimmed, selectively brightened, selectively flashed, selectively blinked, selectively colored, selectively toned, and selectively patterned.

23. The computer-readable medium as recited in claim 17, wherein the mask data selectively defines a visible characteristic of the at least one controllable element in the display device.

24. The computer-readable medium as recited in claim 23, wherein the mask data selectively defines the visible characteristic of the at least one controllable element in the display device by defining the controllable element as being opaque.

25. The computer-readable medium as recited in claim 23, wherein the mask data selectively defines the visible characteristic of the at least one controllable element in the display device by not defining the controllable element as being transparent.

26. The computer-readable medium as recited in claim 17, wherein the composite virtual display layer corresponds to a composite layer data.

27. The computer-readable medium as recited in claim 26, wherein combining the first and second virtual display layers to produce the composite virtual layer further includes logically combining at least the first layer data and the second layer data to form the composite layer data.

28. The computer-readable medium as recited in claim 26, wherein the composite layer data further includes additional layer data associated with at least one additional virtual display layer.

29. The computer-readable medium as recited in claim 17, wherein the first layer data and the second layer data are maintained in a data structure.

30. An arrangement for use in a multiple tasking computer environment, the arrangement comprising:

at least one processor;

memory operatively coupled to the processor; and at least one shared display device operatively coupled to the processor and configured to display composite information as output by the processor after the processor has completed associating a first process with a first virtual display layer and associating at least a second process with a second virtual display layer, and then logically combining layer data corresponding to each of the first virtual display layer and the second virtual display layer to form the composite information, and wherein the first virtual display layer is represented by first layer data including first content data defining at least one desired state for at least one controllable element in a display device, the first content data including at least one type of data selected from a group comprising flag data and mask data, the second virtual display layer is represented by second layer data including second content data defining at least one further desired state for the at least one controllable element in the display device, the second content data including at least one type of data selected from the group comprising flag data and mask data and the processor is operatively configured to combine the first and second virtual display layers to produce the composite virtual display layer based on the at least one type of data selected from the group comprising flag data and mask data within the first and second content data.

31. The arrangement as recited in claim 30, wherein the first virtual display layer and the second virtual display layer are ordered with respect to one another by the processor.

32. The arrangement as recited in claim 31, wherein the first virtual display layer and the second virtual display layer are ordered with respect to a priority scheme.

33. The arrangement as recited in claim 30, wherein the desired state and the further desired state are each defined by binary bit values.

34. The arrangement as recited in claim 30, wherein the flag data defines at least one desired associated property for the at least one controllable element in the display device.

35. The arrangement as recited in claim 34, wherein the at least one desired associated property is selected from a set of associated properties comprising selectively dimmed, selectively brightened, selectively flashed, selectively blinked, selectively colored, selectively toned, and selectively patterned.

36. The arrangement as recited in claim 30, wherein the mask data selectively defines a visible characteristic of the at least one controllable element in the display device.

37. The arrangement as recited in claim 36, wherein the mask data selectively defines the visible characteristic of the at least one controllable element in the display device by defining the controllable element as being opaque.

38. The arrangement as recited in claim 36, wherein the mask data selectively defines the visible characteristic of the at least one controllable element in the display device by not defining the controllable element as being transparent.

39. The arrangement as recited in claim 30, wherein the composite virtual display layer corresponds to a composite layer data.

40. The arrangement as recited in claim 30, wherein the arrangement includes a set top box.

41. The arrangement as recited in claim 40, wherein the set top box further includes a multiple element light emitting diode (LED) front panel display device.

* * * * *